United States Patent [19]

Meissner et al.

[11] Patent Number: 5,060,311

[45] Date of Patent: Oct. 22, 1991

[54] METHOD AND APPARATUS FOR OBTAINING PHASE OR POLARIZATION INSENSITIVE OPTICAL HETERODYNE RECEPTION FOR DPSK OR ASK-MODULATED TRANSMISSION SIGNAL

[75] Inventors: Eckhard Meissner, Munich; Franz Auracher, Baierbrunn, both of Fed. Rep. of Germany

[73] Assignee: Siemens Aktiengesellschaft, Munich, Fed. Rep. of Germany

[21] Appl. No.: 510,859

[22] Filed: Apr. 18, 1990

[30] Foreign Application Priority Data

Jun. 6, 1989 [DE] Fed. Rep. of Germany ....... 3918474

[51] Int. Cl.[5] ............................................ H04B 10/00
[52] U.S. Cl. .................................... 359/192; 359/122; 359/156
[58] Field of Search ................ 455/616, 619, 608, 611; 370/2, 1

[56] References Cited

U.S. PATENT DOCUMENTS

| | | | |
|---|---|---|---|
| 4,723,316 | 2/1988 | Glance | 455/619 |
| 4,856,093 | 8/1989 | Mohr | 455/619 |
| 4,856,094 | 8/1989 | Heidrich et al. | 455/616 |
| 4,868,897 | 9/1989 | Von Helmolt | 455/616 |

OTHER PUBLICATIONS

Article Phase-Insensitive Zero-If Coherent Optical Detection Using Sinusoidal Phase Modulation Instead of Phase Switching and ECOC 1988 Part 2, pp. 65–68.

Primary Examiner—Reinhard J. Eisenzopf
Assistant Examiner—Kinfe-Michael Negash
Attorney, Agent, or Firm—Hill, Van Santen, Steadman & Simpson

[57] ABSTRACT

Method and apparatus for obtaining phase and/or polarization-insensitive optical heterodyne receiving for DPSK or ASK-modulated transmission signal wherein an intermediate frequency which is very low as compared to the data rate of the signals is utilized and at every clock of the transmission signal the phase of the signal is shift keyed between 0° and 90° at the start A1 and in the middle M of the clock time T and the polarization of the signal is shift keyed at least at the start A2 of the second and at the start A4 of the fourth quarter of the clock time T. The transmission signal which is shift keyed in this manner is received by a simple optical heterodyne receiver which has the special characteristics that an intermediate frequency filter ZFF is an integrator which integrates over a respectively one-quarter of the clock time T.

8 Claims, 5 Drawing Sheets

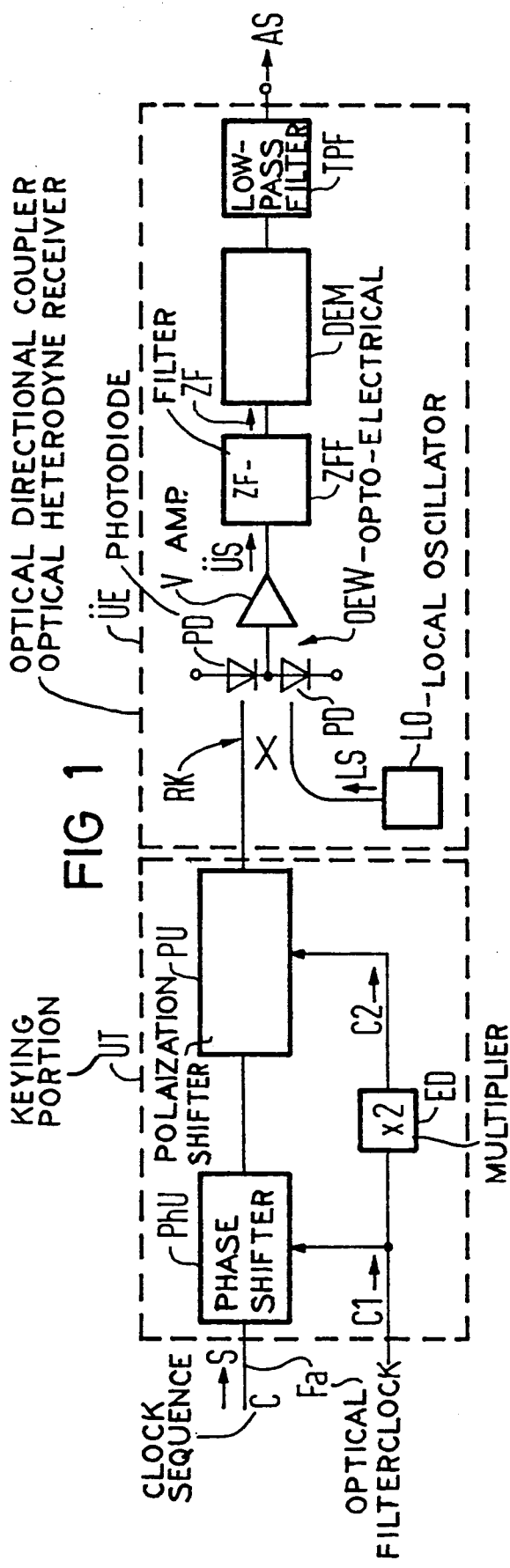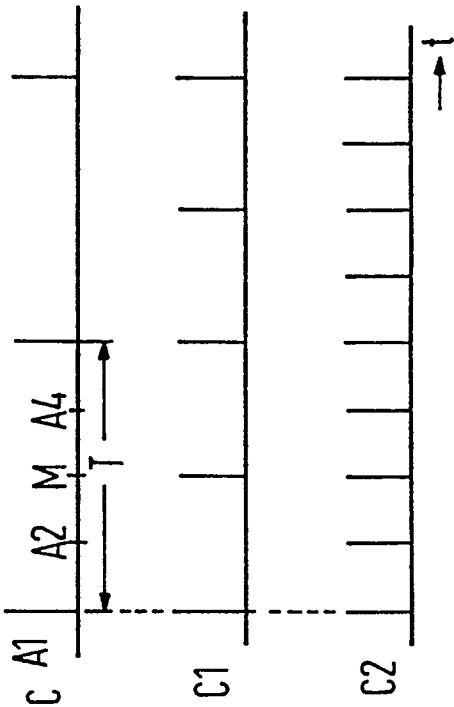
FIG 1
FIG 2

METHOD AND APPARATUS FOR OBTAINING PHASE OR POLARIZATION INSENSITIVE OPTICAL HETERODYNE RECEPTION FOR DPSK OR ASK-MODULATED TRANSMISSION SIGNAL

CROSS-REFERENCES TO RELATED APPLICATIONS

Application entitled "METHOD AND APPARATUS FOR PHASE AND POLARIZATION-INSENSITIVE OPTICAL HETERODYNE RECEIVER FOR A FSK-MODULATED TRANSMISSION SIGNAL" in which the inventor is Eckhard Meissner and which is identified in the attorneys case files as Case No. P90,0238 Ser. No. 512,373, filed Apr. 23, 1990.

BACKGROUND OF THE INVENTION

1. Field of the Invention

The invention relates to a method and apparatus for obtaining optical heterodyne reception for DPSK or ASK-modulated transmission signals.

2. Description of the Prior Art

An optical heterodyne reception wherein a supplied optical transmission signal is superimposed with an optical local oscillator signal and the output signal of the receiver is obtained from the superimposed optical signals by way of an intermediate frequency filter. The receiver sensitivity is generally dependent on the difference between polarization conditions and the phases of the transmission signal and of the local oscillator signal. When the polarization conditions of the transmission signal and local oscillator signal do not coincide losses of sensitivity during reception occur. When using a local intermediate frequency that is one or more orders of magnitude lower as compared to the data rate transmitted by the transmission signal, the optical signal superimposed on each other also change periodically between co-phase and quadrature components.

Prior art polarization diversity receivers are known wherein the transmission signal is divided into two polarization conditions orthogonal relative to each other and these are separately received and are electrically added. Such receivers can be employed for polarization-insensitive reception.

Phase diversity receivers wherein the co-phasal and quadrature components are separately received and electrically added can be utilized for phase-insensitive receivers.

These known receivers require a 90° hybrid which is difficult to realize in optical systems and also require two or four optical heterodyne receivers.

Phase-insensitive and/or polarization-insensitive receivers could also be achieved with the phase-controlled and/or polarization control. However, such controls are extremely complicated.

SUMMARY OF THE INVENTION

The invention provides a simple method and apparatus for obtaining phase and/or polarization-insensitive optical heterodyne reception for DPSK or ASK-modulated transmission signals which have an intermediate frequency that is extremely low compared to the data rate of the signals.

The invention includes phase and polarization-insensitive optical heterodyne reception for DPSK or ASK-modulated optical transmission signals whereby an electrical superposition signal is generated by superimposing the transmission signal with an optical local oscillator signal. By using opto-electrically conversion an intermediate frequency signal is acquired from the superposition signal by filtering whereby said. The intermediate frequency signal is DPSK or ASK-demodulated and low-pass filtered. At every clock of the transmission signal the phase of the signal or of the local oscillator is shift keyed at the start and in the middle of the clock time between 0° and 90°. Alternatively, at every clock signal the transmission or that at every clock the transmission signal polarization of the signal or the local oscillator is shift keyed at the start of the second and at the start of the fourth quarter of the clock time between two mutually orthogonal polarization conditions and the intermediate frequency signal is filtered by successive integration of the superposition signal over one-quarter of the clock time.

The invention is based on data synchronous phase-shift-keying or sinusoidal phase modulation such as described in publication ECOC 1988 Part II, Pages 65-68 and/or on a data-synchronous polarization-shift-keying of the transmission signal.

It can be mathematically demonstrated that the reception according to the invention is phase and/or polarization-insensitive. In other words, the output signal of the receiver is phase or polarization independent in the invention.

An especially advantageous apparatus for implementing a method utilizes a simple optical heterodyne receiver that has only the special characteristics in that the intermediate frequency filter is a special integrator that integrates over one-fourth of the clock time.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a schematic illustration of the apparatus which includes an optical heterodyne receiver and a phase and polarization keying portion connected to the input;

FIG. 2 is a plot of clock pulses versus time that illustrates the various clock signals that are utilized in the invention;

DESCRIPTION OF THE PREFERRED EMBODIMENTS

Figure 3:
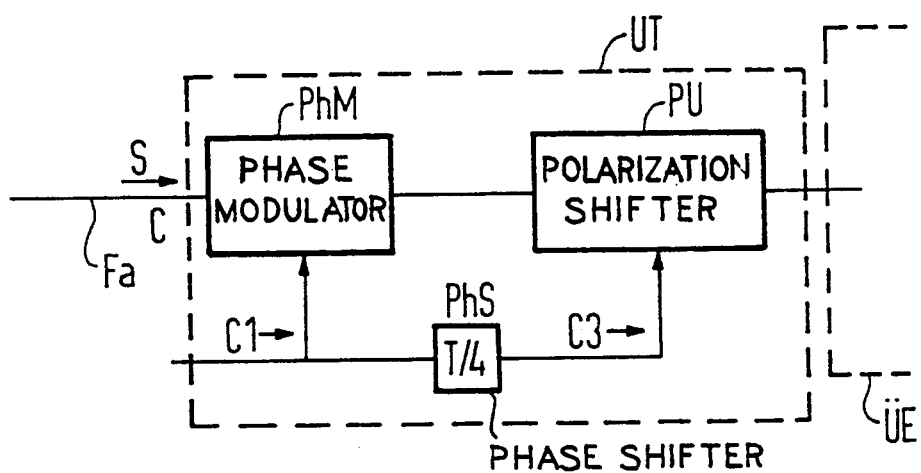
FIG. 3 illustrates a modified phase and polarization-shift-keying portion that can be used instead of the one shown in FIG. 1.

FIG. 1 illustrates an optical heterodyne receiver ÜE to the input of which is connected a keying portion UT that includes a phase-shifter PhU and a polarization shifter PU. With this apparatus, the transmission signal S is supplied through an optical fiber Fa and, for example, is linearly polarized and is clocked with a clock frequency C and is then supplied to the phase shifter PhU in which the phase of this signal S is keyed between 0° and 90° at the respective start A1 and in the middle M of the clock time T of every clock of the clock sequence C. The clock sequence C1 is illustrated in FIG. 2 and is synchronized with the clock sequence C and is supplied to the phase shifter PhU as shown. The transmission signal S which is phase-shift-keyed in this manner is supplied to the polarization shifter PU in which the polarization of the signal S is shifted between two polarization conditions which are linearly polarized perpendicular relative to each other. The signal S is shifted with the clock sequence illustrated in C2 of FIG. 2 which is synchronized with the clock sequence C and has twice the frequency of the clock sequence C1. The shifting occurs at the respective beginning A1, A2, M and A4 of every quarter of the clock timer T of the clock sequence C as shown in FIG. 2.

For example, the clock sequences C1 and C2 can be obtained from the clock sequence C or, respectively, C1 by frequency doubling in a frequency doubler FD. Alternatively, the phase shifter can be clocked with the clock C2 and the polarization shifter can be clocked with the clock C1.

The transmission signal S which has been phase shift keyed and polarized shift keyed in the above-described manner is supplied to an optical directional coupler RK of the optical heterodyne receiver ÜE in which the signal S is superimposed with, for example, a linearly polarized optical local oscillator signal LS that is produced by a local oscillator LO of the receiver ÜE.

An electrical superposition signal ÜS which contains an intermediate frequency ZF having a very low intermediate frequency as compared to the clock frequency of the clock sequence C that clocks the transmission signal S, is generated from the optical signals S and LS which are superimposed upon each other. This signal is generated in a known opto-electrical conversion manner in an opto-electrical converter OEW which contains one or two photodetectors PD which are followed by an electrical amplifier V.

The intermediate frequency signal ZF is filtered from the superimposed signal ÜS in an intermediate frequency filter ZFF which is in the form of an integrator that successively integrates the supplied superposition signal ÜS over respectively one-fourth of the clock time T. In other words, over the respective time quarters shown in FIG. 2 which extends from A1 through A2, from A2 through M, from M through A4 and from A4 to the start A1 of the next clock time 2 and so forth of the clock sequence C. The intermediate frequency signal ZF which contains the aggregate of these integrals is demodulated in a demodulator DEM which is an ASK demodulator for an ASK modulated transmission S and which is a DPSK demodulator for a DPSK modulated transmission signal S.

The demodulated signal is supplied to a low-pass filter TPF that respectively averages over a clock time T.

The data carrying output signal AS of the low-pass filter TPF can be mathematically demonstrated to be independent of both the phase and the polarization of the received transmission signal S. Both of these can fluctuate which can each respectively fluctuate.

In the example described, the polarization-shift-keying or, respectively, phase-shift-keying occurs at the start of every quarter of the clock time T, but this is not necessary. It is satisfactory if the shift-keying is accomplished only at the start A2 of the second and at the start of the A4 of the fourth quarter of every clock time T of the clock sequence C. Instead of the clock sequence C2 of FIG. 2, the clock sequence C3 of FIG. 4 can be utilized for this case and with C3 corresponding to the clock sequence C1, but being phase shifted by one-fourth of the clock time T as compared thereto. The clock sequence C3 can be obtained from the clock sequence C1 by a phase shifter PhS such as illustrated in FIG. 3 which shifts the phase of the clock sequence C1 by T/4. In this case, alternatively the clock sequence C1 can be utilized for polarization shift-keying and the clock sequence C3 can be utilized for phase shift-keying.

Figure 4:
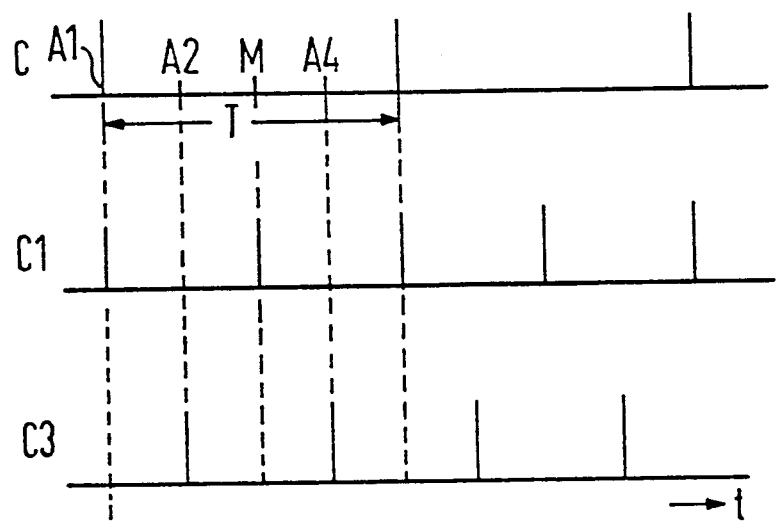
FIG. 4 is a plot of clock sequences used in the invention.
Figure 5:
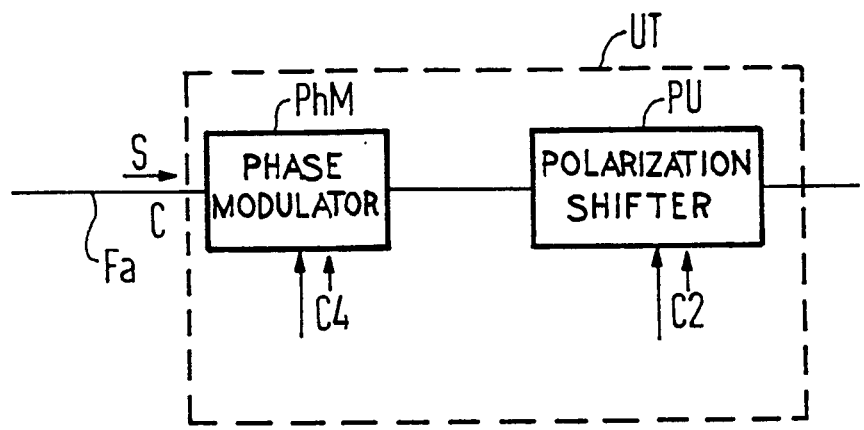
FIG. 5 is a block diagram of a further modified phase in polarization-shift-keying components that can be used instead of those shown in FIGS. 1 and 3.
Figure 6:
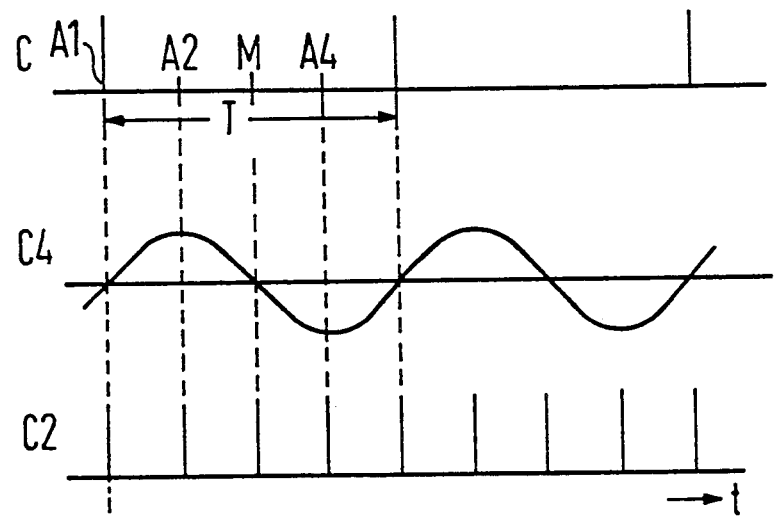
FIG. 6 is a plot of time diagram illustrating a clock signal and shows a sinusoidal modulation signal synchronized with the clock for controlling the keying portion of FIG. 5.

The phase insensitivity of the output signal AS can also be obtained by a sinusoidal modulation of the phase of the transmission signal S which is supplied to the keying portion UT. Instead of the phase-shift-keyed PhU, a phase modulator PhM such as illustrated in FIG. 5 can be utilized which is controlled with a sinusoidal control signal C4 which is illustrated in FIG. 6. The control signal C4 and/or the phase-modulator PhM are selected such that the amplitude of the sinusoidal modulation of the phase of the transmission signal S lies at 70.2° and the zero axis crossings occur at the start A1 and in the middle M of every clock time T. The polarization independence of the output signal AS can be obtained in this case by using an additional polarization shift-keying which corresponds to the clock sequence C2 which is illustrated in FIG. 2 or with the clock sequence C3 which is illustrated in FIG. 4.

Figure 8:
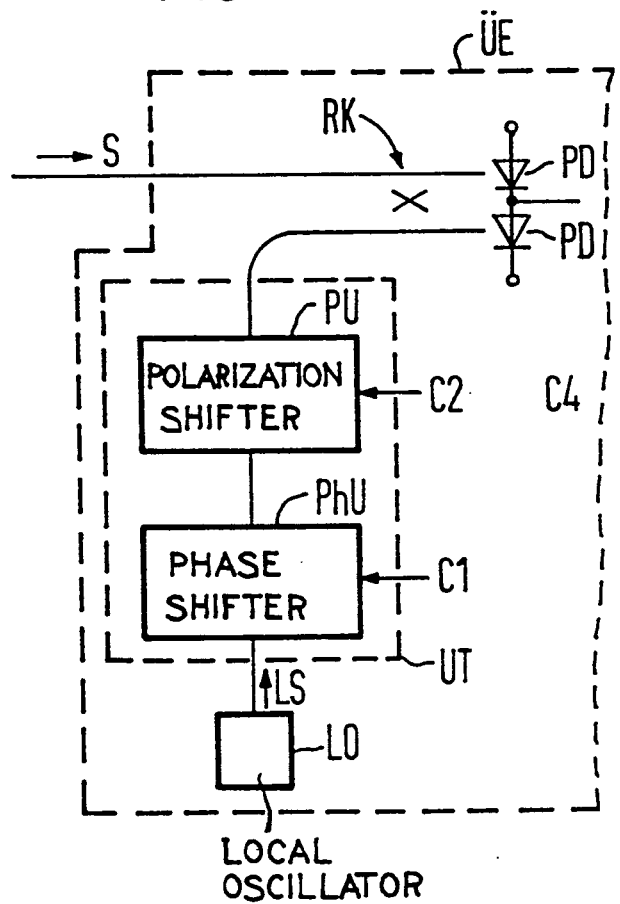
FIG. 8 is a block diagram illustrating a phase shift-over means as well as a polarization shift-over means arranged between the optical means and the local oscillator.

In the examples given above, and in the example of FIG. 8 illustrated below, the phase is shift keyed first and then the polarization of the transmission signal S or, respectively, of the local oscillator signal LS is then shift keyed. Conversely, the polarization can first be shift keyed shift first and then the phase shift of the transmission signal or, respectively, of the local oscillator signal LS can be accomplished.

Figure 7:
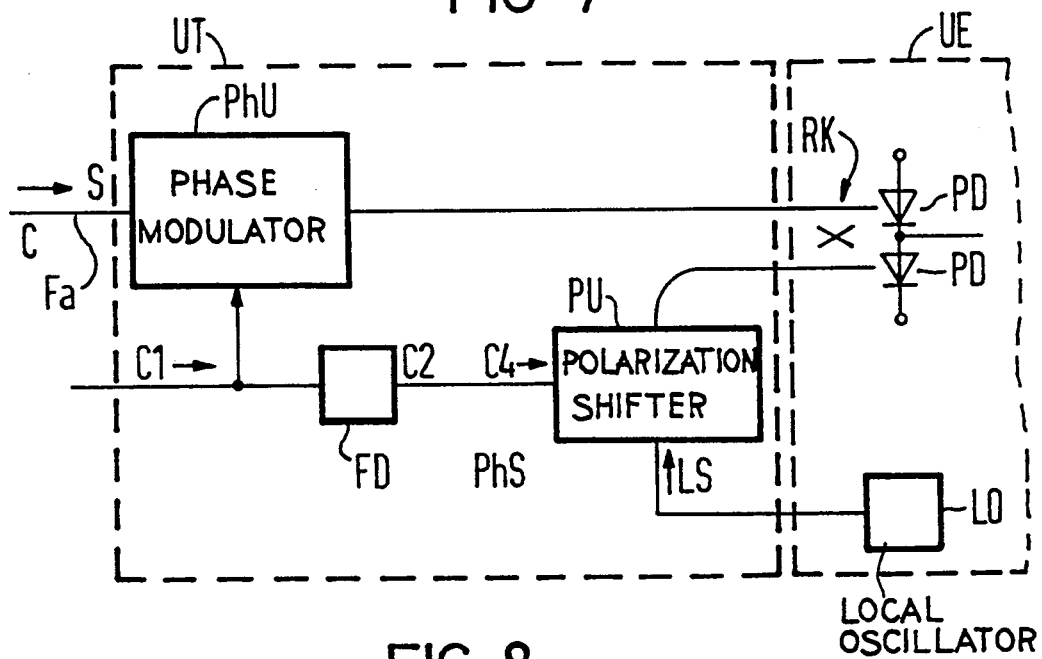
FIG. 7 is a block diagram illustrating a polarization switch-over means of the keying portion which is arranged between the local oscillator and the optical means for superimposing the transmission signal and the local oscillator signal.
Figure 9:
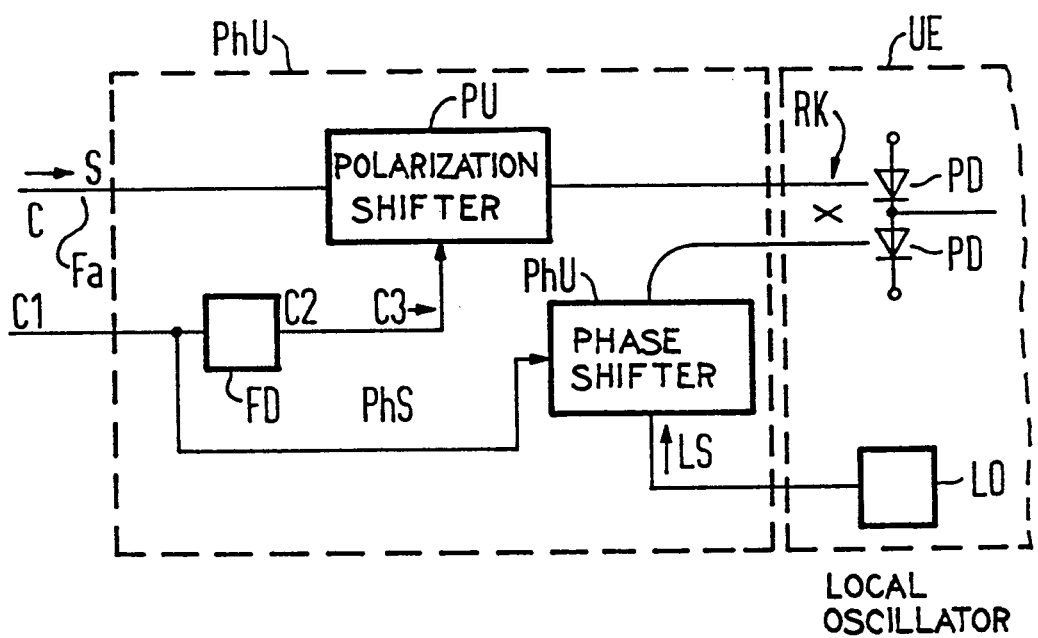
FIG. 9 is a block diagram illustrating a phase shift-over means arranged between the optical means and the local oscillator and wherein polarization switch-over means is arranged at the transmitter.

The phase-shift-keying or the phase-modulation as well can be implemented at the transmitter side or at the receiver side such as for example, immediately preceding the receiver or following the local oscillator. The polarization-shift-keying can be implemented at the transmitter or at the receiver following the local oscillator. FIG. 7 illustrates an example where the polarization-shift-keyed PU of the keying portion UT shift keys the polarization condition of the local oscillator signal LS instead of the transmission signal S. The phase shifter PhU keys the phase of the transmission signal S at the transmitter or receiver or respectively sinusoidally modulates it. In the example, illustrated in FIG. 8, only the local oscillator signal LS and not the transmission signal S is shift-keyed in polarization and is phase shifted. In the example of FIG. 9, by contrast, the phase of the local oscillator signal LS is shift-keyed whereas the polarization of the transmission signal S is shift-keyed at the transmitter. In the examples of FIGS. 7, 8 and 9, the phase-shifter PhU can be replaced by a sinusoidally controlled phase modulator PhM which is driven with a sinusoidal control signal C4 illustrated in FIG. 6. In the example of FIG. 8, the phase shifter PhU can also be clocked with the clock sequence C2 or C4 and the polarization shifter PU can be clocked with the clock sequence C1.

Although the invention has been described with respect to preferred embodiments, it is not to be so limited as changes and modifications can be made which are within the full intended scope of the invention as defined by the appended claims.

We claim as our invention:

1. A method for obtaining phase and/or polarization-insensitive optical heterodyne reception for a DPSK or ASK modulated optical transmission signal (S), whereby an electrical superposition signal (ÜS) is generated by superimposing the transmission signal (S) with an optical local oscillator signal (LS) which is obtained from a local oscillator (LO) and by opto-electrical conversion and an intermediate frequency signal (ZF) is obtained from this superposition signal (ÜS) by filtering whereby said intermediate frequency signal is DPSK or, respectively, ASK-demodulated and low-pass filtered, comprising the steps of shift-keying at every clock of the transmission signal (S), the phase of this signal (S) or of the local oscillator signal (LS) at the start (A1) and in the middle (M) of the clock time (T) of such clock between 0° and 90° and/or in that, at every clock of the transmission signal (S), shift-keying the polarization of the signal (S) or of the local oscillator signal (LS) at the start (A2) of the second and at the start (A4) of the fourth quarter of this clock time (T) between two mutually orthogonal polarization conditions and acquiring by successive integrating the intermediate frequency signal (ZF) the superposition signal (ÜS) over respectively one quarter of the clock time (T).

2. A method according to claim 1, comprising shift-keying the polarization of the transmission signal (S) or of the local oscillator signal (LS) between two mutually orthogonal polarization conditions at the start (A1, A2, M, A4) of every quarter of the clock time (T).

3. A method for obtaining a phase-insensitive and/or polarization-insensitive optical heterodyne reception for a DPSK or ASK modulated optical transmission signal (S), whereby an electrical superposition signal (ÜS) is generated by superimposing the transmission signal (S) with an optical local oscillator signal (LS) which is obtained from a local oscillator (LO) and by opto-electrical conversion and an intermediate frequency signal (ZF) is acquired from this superposition signal (ÜS) by filtering whereby said intermediate frequency signal is DPSK or, respectively, ASK-demodulated and low-pass filtered, comprising the steps of shift-keying at every clock of the transmission signal (S), the phase of the signal (S) or of the local oscillator signal (LS) between 0° and 90° at least at the start (A2) of the second and at the start (A4) of the fourth quarter of the clock time (T) of the clock and/or in that, shift-keying at every clock of the transmission signal (S), the polarization of this signal (S) or of the local oscillator signal between two mutually orthogonal polarization conditions at the start (A1) and in the middle (M) of this clock time (T); and acquiring by successive integrating the intermediate frequency signal (ZF) the superposition signal (ÜS) over respectively one quarter of the clock time (T).

4. A method according to claim 3, comprising shift-keying the phase of the transmission signal (S) or of the local oscillator signal (LS) between 0° and 90° at the start (A1, A2, M, A4) of every quarter of the clock time (T).

5. A method for obtaining a phase and/or polarization insensitive optical heterodyne reception for a DPSK or ASK modulated optical transmission signal (S), whereby an electrical superposition signal (ÜS) is generated by superimposing the transmission signal (S) with an optical local oscillator signal (LS) which is obtained from a local oscillator and by opto-electrical conversion and an intermediate frequency signal (ZF) is acquired from this superposition signal (ÜS) by filtering whereby said intermediate frequency signal is DPSK or, respectively, ASK-demodulated and low-pass filtered, comprising the steps of sinusoidally modulating at every clock of the transmission signal (S) the phase of the signal (S) or of the local oscillator signal (LS) with an amplitude of 70.2° so that the zero-axis crossings of the sine wave are at the start (A1) and in the middle (M) of the clock time (T) of the clock; and acquiring by successive integrating the intermediate frequency signal (ZF) of the superposition signal (ÜS) over respectively one quarter of the clock time (T).

6. A method according to claim 5 for the realization of a phase-insensitive and polarization-insensitive optical heterodyne reception for the DPSK and ASK modulated transmission signal (S), comprising shift-keying the polarization of the transmission signal (S) or of the local oscillator signal (LS) between two mutually orthogonal polarization conditions at least at the start (A2) of the second and at the start (A4) of the fourth quarter of this clock time (T).

7. A method according to claim 6, comprising shift-keying the polarization of the transmission signal (S) or of the local oscillator signal (LS) between two mutually orthogonal polarization conditions at the start (A1, A2, M, A4) of every quarter of the clock time (T).

8. Apparatus for obtaining a phase and/or a polarization insensitive optical heterodyne receiver for a DPSK or ASK modulated optical transmission signal (S) comprising, a clockable phase shifter (PhU) or sinusoidally controllable phase modulator (PhM) for shift-keying or sinusoidal modulating the phase of the transmission signal (S) or of a local oscillator signal (LS), obtained from a local oscillator (LO), and/or a clockable polarization shifter (PU) for shift-keying the polarization of the transmission signal (S) or of the local oscillator signal (LS), and an optical heterodyne receiver (ÜS) having an optical means (RK) for superimposing the optical transmission signal (S) and the local oscillator signal (LS), an opto-electrical converter means (OEW) for converting the two superimposed optical signals (S, LS) into the electrical superposition signal (ÜS), an intermediate frequency filter (ZF) for filtering the superposition signal (ÜS) and generating the intermediate frequency signal (ZF), a DPSK or ASK demodulator (DEM) for demodulating the intermediate frequency signal (ZF), and a low-pass filter (TPF) for filtering the demodulated signal, and whereby the intermediate frequency filter (ZFF) is formed of an integrator which integrates over a quarter of the clock time (T).

* * * * *